United States Patent
Ye

(10) Patent No.: US 11,461,116 B2
(45) Date of Patent: Oct. 4, 2022

(54) GRAPHICAL USER INTERFACE REDRAWING METHOD. TERMINAL DEVICE AND COMPUTER READABLE STORAGE MEDIUM

(71) Applicant: HUIZHOU TCL MOBILE COMMUNICATION CO., LTD., HuiZhou (CN)

(72) Inventor: Lei Ye, HuiZhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 119 days.

(21) Appl. No.: 16/976,182

(22) PCT Filed: Feb. 28, 2019

(86) PCT No.: PCT/CN2019/076588
§ 371 (c)(1),
(2) Date: Aug. 27, 2020

(87) PCT Pub. No.: WO2019/166000
PCT Pub. Date: Sep. 6, 2019

(65) Prior Publication Data
US 2020/0409727 A1  Dec. 31, 2020

(30) Foreign Application Priority Data

Mar. 2, 2018  (CN) .......................... 201810174793.7

(51) Int. Cl.
*G06F 9/451*  (2018.01)
*G06F 16/22*  (2019.01)
(Continued)

(52) U.S. Cl.
CPC ................ *G06F 9/451* (2018.02); *G06F 8/38* (2013.01); *G06F 12/0808* (2013.01);
(Continued)

(58) Field of Classification Search
CPC ........ G06F 9/451; G06F 8/38; G06F 12/0808; G06F 12/0815; G06F 16/2255; G06F 16/2365; G06T 1/60
(Continued)

(56) References Cited

U.S. PATENT DOCUMENTS

| 7,177,918 B2 | 2/2007 | Joshi et al. |
| 2006/0265377 A1 | 11/2006 | Raman et al. |

(Continued)

FOREIGN PATENT DOCUMENTS

| CN | 1516418 A | 7/2004 |
| CN | 101501685 A | 8/2009 |

(Continued)

OTHER PUBLICATIONS

Ryan cohen, GUI Design for Android Apps (Year: 2014), 147 pages.*

(Continued)

*Primary Examiner* — Jennifer Mehmood
*Assistant Examiner* — Kim Thanh T Tran
(74) *Attorney, Agent, or Firm* — Mark M. Friedman

(57) ABSTRACT

Disclosed by the present invention are a graphical user interface redrawing method, a terminal device and a computer readable storage medium. The method comprises: merging invalidate data of multiple Views under the same View Group in the same VSYNC drawing period in an Android system GUI and saving to a HashMap; sending to a user interface (UI) thread a message for delaying execution of an invalidate instruction; reading all invalidate data from the HashMap and emptying the HashMap after a delay time interval of the message is reached; and executing the invalidate instruction according to the read invalidate data.

17 Claims, 4 Drawing Sheets

(51) Int. Cl.
*G06F 16/23* (2019.01)
*G06F 8/38* (2018.01)
*G06F 12/0808* (2016.01)
*G06F 12/0815* (2016.01)
*G06T 1/60* (2006.01)

(52) U.S. Cl.
CPC ...... *G06F 12/0815* (2013.01); *G06F 16/2255* (2019.01); *G06F 16/2365* (2019.01); *G06T 1/60* (2013.01)

(58) Field of Classification Search
USPC ........................................................ 345/557
See application file for complete search history.

(56) References Cited

U.S. PATENT DOCUMENTS

| | | | |
|---|---|---|---|
| 2006/0265394 A1 | 11/2006 | Raman et al. | |
| 2006/0265395 A1 | 11/2006 | Raman et al. | |
| 2006/0265396 A1 | 11/2006 | Raman et al. | |
| 2009/0319933 A1 | 12/2009 | Zaika et al. | |
| 2017/0192942 A1 | 7/2017 | Craik et al. | |
| 2017/0199749 A1* | 7/2017 | Wolfson | G06F 9/451 |
| 2017/0228346 A9* | 8/2017 | Steeb, III | G06F 16/93 |

FOREIGN PATENT DOCUMENTS

| | | |
|---|---|---|
| CN | 102737041 A | 10/2012 |
| CN | 106648602 A | 5/2017 |
| CN | 108549534 A | 9/2018 |

OTHER PUBLICATIONS

Extended European Search Report Dated Oct. 29, 2021 From European Patent Office Re. Application No. EP19759967.3.
Cohen Ryan et al: "GUI Design for Android Apps" In : "GUI Design for Android Apps", Dec. 31, 2014, Apress Open, XP055852938, pp. 1-147.

* cited by examiner

GRAPHICAL USER INTERFACE REDRAWING METHOD, TERMINAL DEVICE AND COMPUTER READABLE STORAGE MEDIUM

CROSS REFERENCE TO RELATED APPLICATION

This application claims the priority of International Application No. PCT/CN2019/076588, filed Feb. 28, 2019, titled "GRAPHICAL USER INTERFACE REDRAWING METHOD, TERMINAL DEVICE AND COMPUTER READABLE STORAGE MEDIUM", which claims priority to Chinese Application No. 201810174793.7, filed on Mar. 2, 2018. The entire disclosures of each of the applications are incorporated herein by reference.

TECHNICAL FIELD

The present invention relates to graphical user interface (GUI) technologies, and more particularly to a graphical user interface redrawing method, a terminal device and a computer readable storage medium.

DESCRIPTION OF RELATED ARTS

As a mainstream mobile operating system in the market, Android currently uses GUI technologies to present users with a rich interactive interface. Generally, the GUI organizes various user interface (UI) elements using View hierarchy. Each basic UI element exists in the form of View. Multiple Views may be included in a same View Group. The assembled View Group will continue to be combined with other Views or even View Groups to generate a View Tree eventually. Each View Tree has only one View Root.

When the content of a certain element on the UI has a update, a View to which the element belongs will utilize an invalidate instruction to notify an upper layer, View Group, which View currently has a content update and a region (i.e., Dirty region) where the updated content is located on the interface. After the Dirty region is processed accordingly by the View Group with its own display region and transformation matrix, the invalidate instruction will continue to be transmitted to a View Group of an upper layer until it is finally transmitted to a View Root. After receiving the invalidate instruction, the View Root will redraw the View Tree at the time a next vertical synchronization signal (VSYNC) arrives.

However, there is a problem for transmission of the invalidate instruction in the View Tree. That is, when all the multiple Views that belong to a same View Group have content updates before the next VSYNC signal arrives, transmission of the invalidate instructions will be performed repeatedly for many times for the whole View Tree, thereby reducing efficiency of drawing the GUI.

SUMMARY

Technical Problems

Embodiments of the present invention provide a graphical user interface redrawing method, a terminal device and a computer readable storage medium, capable of avoiding repeated transmission of invalidate instructions in conventional skills.

Technical Solutions

An embodiment of the present invention provides a graphical user interface redrawing method, including steps of:

in response to a content update of a View in the graphical user interface, uploading a corresponding invalidate data to a HashMap;

determining whether a View Group to which the View belongs has saved any invalidate data in the HashMap;

in response to having any saved invalidate data, merging the uploaded invalidate data and the saved invalidate data and saving the merged invalidate data to the HashMap;

sending to a user interface (UI) thread a message for delaying execution of an invalidate instruction;

reading all the invalidate data from the HashMap and emptying the HashMap after a delay time interval of the message is reached; and executing the invalidate instruction according to the read invalidate data.

In the graphical user interface redrawing method of the present invention, the method further includes a step of:

in response to a case that the View Group to which the View belongs has not saved any invalidate data in the HashMap, directly saving the uploaded invalidate data to the HashMap.

In the graphical user interface redrawing method of the present invention, the invalidate data includes a reference of the View Group to which the View belongs, and a Dirty region.

In the graphical user interface redrawing method of the present invention, the HashMap uses the reference of the View Group as a primary Key.

In the graphical user interface redrawing method of the present invention, the step of determining whether the View Group to which the View belongs has saved any invalidate data in the HashMap includes:

using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

In the graphical user interface redrawing method of the present invention, the delay time interval is smaller than a time interval of a vertical sync (VSYNC) signal.

In the graphical user interface redrawing method of the present invention, the step of sending to the UI thread the message for delaying execution of the invalidate instruction includes:

sending to the UI thread a message with the delay time interval for delaying execution of the invalidate instruction.

An embodiment of the present invention further provides a terminal device, including a storage, a processor and a graphical user interface redrawing program stored in the storage and executable by the processor, wherein the graphical user interface redrawing program is executed by the processor to perform the steps of:

in response to a content update of a View in the graphical user interface, uploading a corresponding invalidate data to a HashMap;

determining whether a View Group to which the View belongs has saved any invalidate data in the HashMap;

in response to having any saved invalidate data, merging the uploaded invalidate data and the saved invalidate data and saving the merged invalidate data to the HashMap;

sending to a user interface (UI) thread a message for delaying execution of an invalidate instruction;

reading all the invalidate data from the HashMap and emptying the HashMap after a delay time interval of the message is reached; and executing the invalidate instruction according to the read invalidate data.

In the terminal device of the present invention, in response to a case that the View Group to which the View belongs has not saved any invalidate data in the HashMap, the uploaded invalidate data are directly saved to the HashMap.

In the terminal device of the present invention, the invalidate data includes a reference of the View Group to which the View belongs, and a Dirty region.

In the terminal device of the present invention, the HashMap uses the reference of the View Group as a primary Key.

In the terminal device of the present invention, the step of determining whether the View Group to which the View belongs has saved any invalidate data in the HashMap, performed by executing the graphical user interface redrawing program by the processor, includes:

using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

In the terminal device of the present invention, the delay time interval is smaller than a time interval of a vertical sync (VSYNC) signal.

An embodiment of the present invention further provides a computer readable storage medium, storing a graphical user interface redrawing program, which is executed by a processor to perform the steps of:

in response to a content update of a View in the graphical user interface, uploading a corresponding invalidate data to a HashMap;

determining whether a View Group to which the View belongs has saved any invalidate data in the HashMap;

in response to having any saved invalidate data, merging the uploaded invalidate data and the saved invalidate data and saving the merged invalidate data to the HashMap;

sending to a user interface (UI) thread a message for delaying execution of an invalidate instruction;

reading all the invalidate data from the HashMap and emptying the HashMap after a delay time interval of the message is reached; and executing the invalidate instruction according to the read invalidate data.

In the computer readable storage medium of the embodiment of the present invention, the graphical user interface redrawing program is executed by the processor to perform a further step of:

in response to a case that the View Group to which the View belongs has not saved any invalidate data in the HashMap, directly saving the uploaded invalidate data to the HashMap.

In the computer readable storage medium of the embodiment of the present invention, the invalidate data includes a reference of the View Group to which the View belongs, and a Dirty region.

In the computer readable storage medium of the embodiment of the present invention, the HashMap uses the reference of the View Group as a primary Key.

In the computer readable storage medium of the embodiment of the present invention, the step of determining whether the View Group to which the View belongs has saved any invalidate data in the HashMap includes:

using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

In the computer readable storage medium of the embodiment of the present invention, the delay time interval is smaller than a time interval of a vertical sync (VSYNC) signal.

In the computer readable storage medium of the embodiment of the present invention, the step of sending to the UI thread the message for delaying execution of the invalidate instruction, performed by executing the graphical user interface redrawing program by the processor, includes:

sending to the UI thread a message with the delay time interval for delaying execution of the invalidate instruction.

Beneficial Effects

By merging the invalidate data of multiple Views that belong to a same View Group in a same VSYNC drawing period in an Android system GUI, the graphical user interface redrawing method, the terminal device and the computer readable storage medium proposed in the present invention can reduce the number of traversal operations on the overall View Tree for content updates of the UI, thereby improving the whole efficiency of drawing the GUI.

The objectives, features and advantages of the present invention will be described in further detail below with reference to embodiments in accompanying with the appending drawings.

DETAILED DESCRIPTION

It should be understood that the specific embodiments described herein are merely for interpreting the present invention and the present invention is not limited thereto.

Embodiment 1

Figure 1:
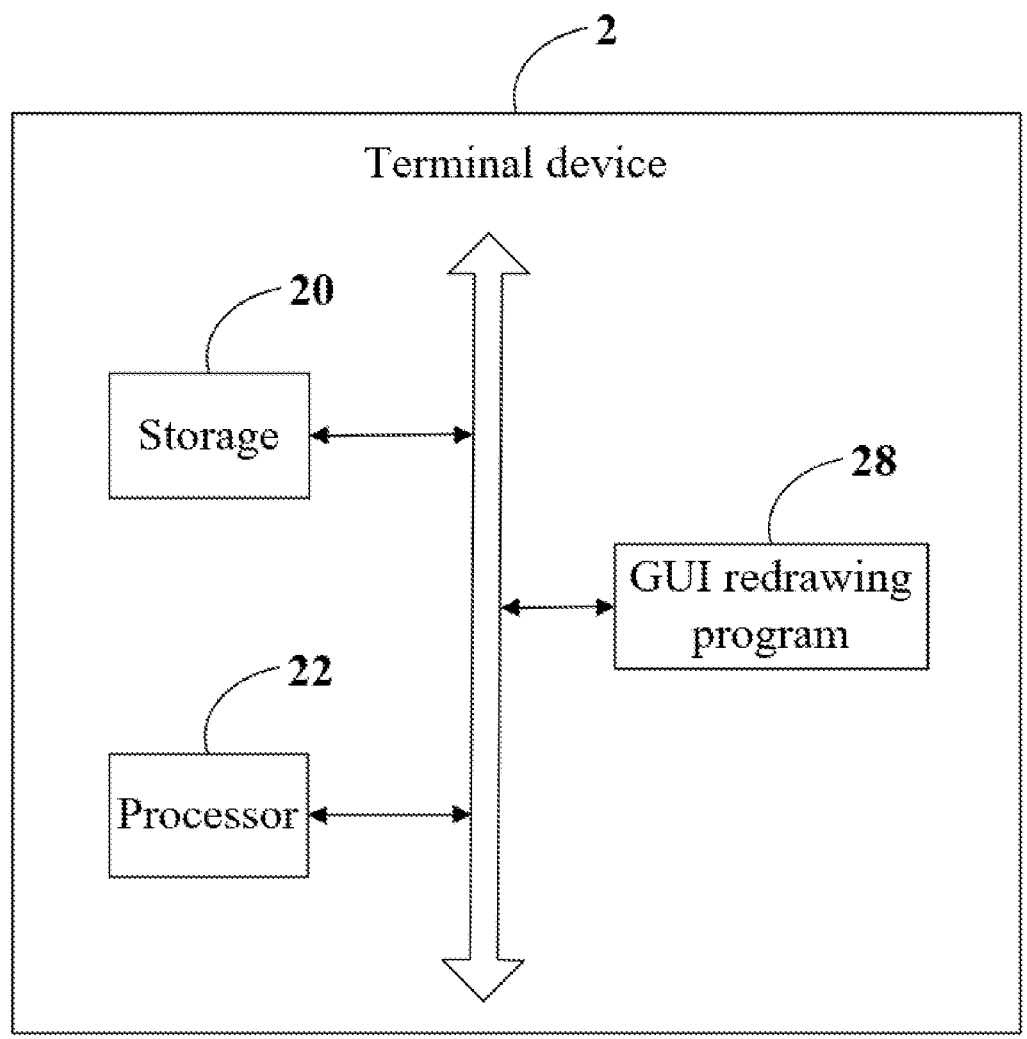
FIG. 1 is a diagram illustrating an architecture of a terminal device provided in a first embodiment of the present invention.

Referring to FIG. 1, a first embodiment of the present invention provides a terminal device 2. The terminal device 2 can be any electronic device (e.g., a cell phone) having a graphical user interface. The terminal device 2 includes a storage 20, a processor 22 and a graphical user interface redrawing program 28.

The storage 20 at least includes one type of readable storage medium and is configured to store an operating system and various application software installed on the terminal device 2 (for example, program codes of the graphical user interface redrawing program 28). In addition, the storage 20 may further be configured to temporarily store various types of data that have been outputted or will be outputted.

In some embodiments, the processor 22 may be a central processing unit (CPU), a controller, a microcontroller, a microprocessor or other data processing chip. The processor 22 is usually configured to control the whole operations of the terminal device 2. In the present embodiment, the processor 22 is configured to run the program codes stored in the storage 20 or process data, for example, run the graphical user interface redrawing program 28.

The graphical user interface redrawing program 28 is executed by the processor 22 to perform the following steps:

(1) in response to a content update of a View in the graphical user interface, uploading a corresponding invalidate data to a HashMap;

(2) determining whether a View Group to which the View belongs has saved any invalidate data in the HashMap;

(3) in response to having any saved invalidate data, merging the uploaded invalidate data and the saved invalidate data and saving the merged invalidate data to the HashMap;

(4) in response to having no saved invalidate data, saving the uploaded invalidate data to the HashMap;

(5) sending to a user interface (UI) thread a message for delaying execution of an invalidate instruction;

(6) reading all the invalidate data from the HashMap and emptying the HashMap after a delay time interval of the message is reached;

(7) executing an invalidate instruction according to the read invalidate data.

In some embodiments, in response to a case that the View Group to which the View belongs has not saved any invalidate data in the HashMap, the uploaded invalidate data are directly saved to the HashMap.

In some embodiments, the invalidate data includes a reference of the View Group to which the View belongs, and a Dirty region.

In some embodiments, the HashMap uses the reference of the View Group as a primary Key.

In some embodiments, the step of determining whether the View Group to which the View belongs has saved any invalidate data in the HashMap, performed by executing the graphical user interface redrawing program 28 by the processor 22, includes:

using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

In some embodiments, the delay time interval is smaller than a time interval of a vertical sync (VSYNC) signal.

Detailed description on above steps refers to the following second embodiment, and is not repeated herein.

A person having ordinary skills in the art can acknowledge that the structures depicted in FIG. 1 do not construct a limitation to the terminal device 2, and the terminal device 2 may further include other necessary components, or combine with some other components, or have different component deployments.

Embodiment 2

Figure 2:
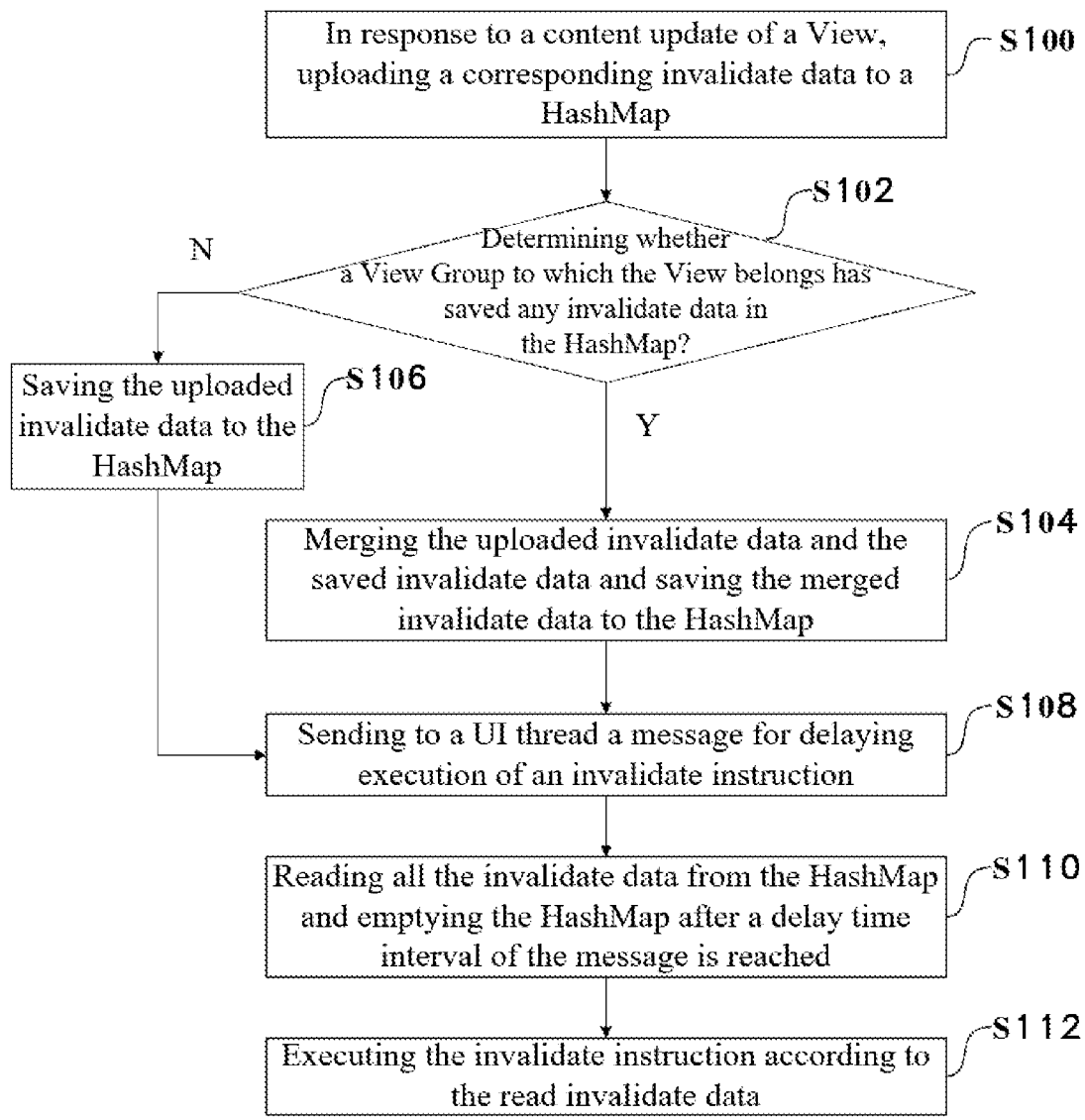
FIG. 2 is a flowchart of a graphical user interface redrawing method provided in a second embodiment of the present invention.

Referring to FIG. 2, a second embodiment of the present invention provides a graphical user interface redrawing method, which is applicable to the terminal device 2. In the present embodiment, the order for executing the steps in the flowchart shown in FIG. 2 may be changed according to different needs, and some of the steps may be omitted. The method includes the following steps.

In Step S100, in response to a content update of a View, corresponding invalidate data is uploaded to a HashMap.

Specifically, the invalidate data includes a reference of a View Group to which the View belongs, and a Dirty region. In order to avoid repeated transmission of invalidate instructions in conventional skills, in response to a need for the view to update its content, a data structure (i.e., the invalidate data) including the reference of the View Group to which the View belongs and the Dirty region to which an updated content belongs is saved to a HashMap in the present embodiment, rather than directly transmitting the invalidate instruction to the View Group to which the View belongs to. The HashMap uses the reference of the View Group as a primary Key.

Figure 3:
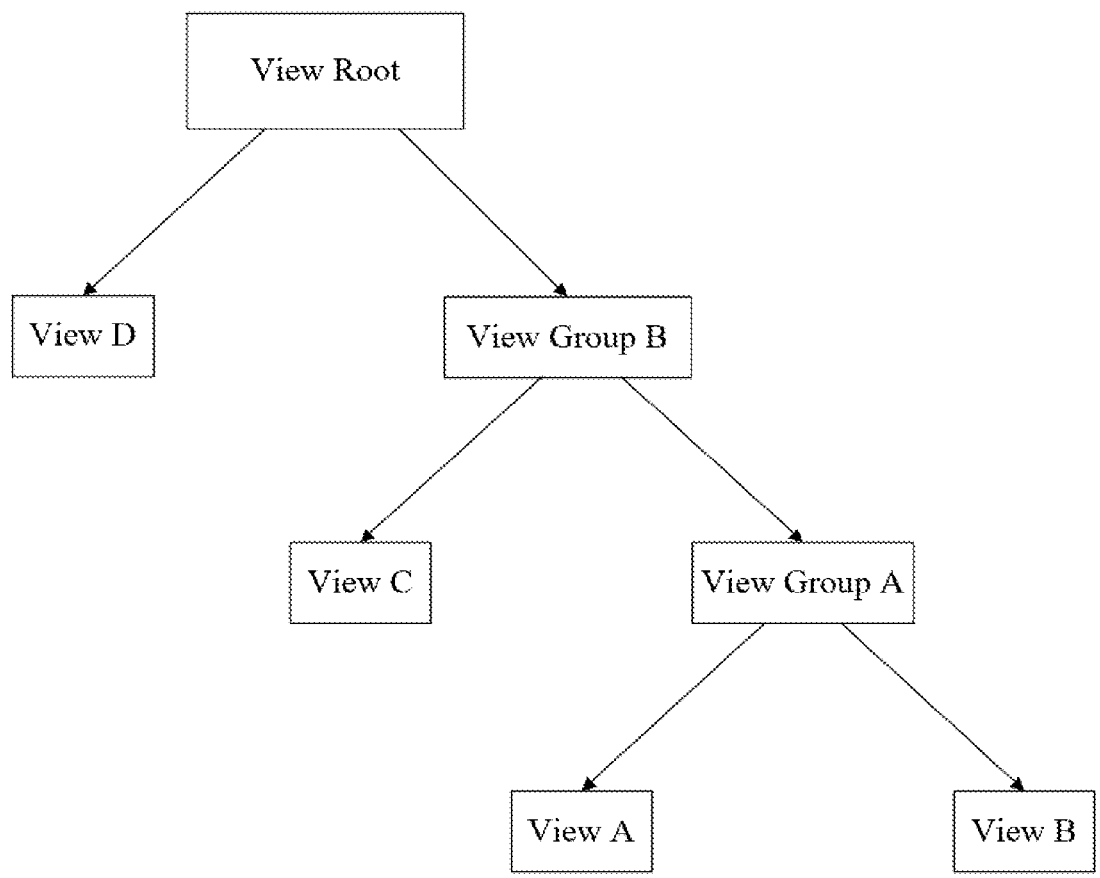
FIG. 3 is a schematic diagram illustrating an example of a View Tree of the graphical user interface in the present invention.

FIG. 3 is a schematic diagram illustrating an example of a View Tree of the graphical user interface. Each basic user interface (UI) element exists in the form of View. Multiple Views may be included in a same View Group. The assembled View Group will continue to be combined with other Views or even View Groups to generate a View Tree eventually. The View Tree has only one View Root. When the content of a certain View in the View Tree needs to be updated, the reference of the View Group to which the View belongs and the Dirty region are uploaded to the HashMap.

In Step S102, it determines whether the View Group to which the View belongs has saved any invalidate data in the HashMap. If yes, execute Step S104. If not, execute Step S106.

Specifically, before the uploaded invalidate data is saved, the reference of the View Group serves as a Key to check whether any invalidate data have been saved in the HashMap. If it is found that the HashMap has saved any invalidate data for a same Key, it means that there are other Views, among the Views included in a corresponding View Group, that have initiated an invalidate process and are waiting for execution.

In Step S104, the uploaded invalidate data and the saved invalidate data are merged and the merged invalidate data are saved to the HashMap.

Specifically, in a case that the View Group to which the View belongs has saved any invalidate data in the HashMap, it needs to merge the invalidate data of multiple Views that belong to a same View Group (merging the Dirty regions basically), and a merged data structure is used to substitute the data structure corresponding to a same Key in the previous HashMap.

Figure 4:
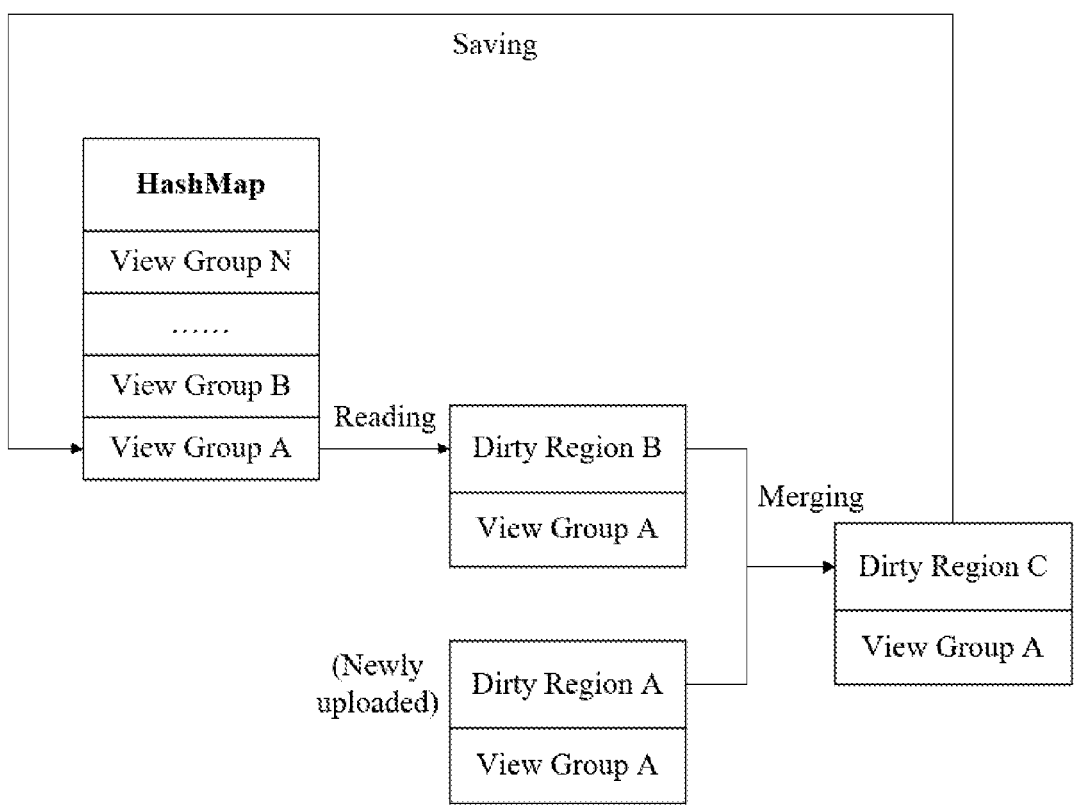
FIG. 4 is a schematic diagram illustrating an example of Step S104 in FIG. 3.

For example, as shown in FIG. 4, it is assumed that View A in the View Tree has content that needs to be updated. Then, invalidate data including View Group A to which View A belongs and corresponding Dirty Region A are uploaded to the HashMap. At the time, since invalidate data (including View Group A to which View B belongs to and corresponding Dirty Region B) previously uploaded by View B under View Group A have been saved in the HashMap, it needs to merge the aforesaid two invalidate data under View Group A to obtain new invalidate data including View Group A to which View A and View B belong and corresponding Dirty Region C (a combination of A and B) to substitute the invalidate data previously uploaded by View B, and save it in the HashMap.

In Step S106, the uploaded invalidate data is saved to the HashMap.

Specifically, in a case that the View Group to which the View belongs has not saved any invalidate data in the HashMap, it means that no other View in the View Group to which the View belongs has initiated an invalidate process, and it only needs to directly save the invalidate data uploaded by the View to the HashMap.

In Step S108, a message for delaying execution of the invalidate instruction is sent to a UI thread.

Specifically, after the save action is completed, a message (called Delayed Invalidate Message) with a delay time interval for delaying execution of the invalidate instruction is sent to a UI thread. There is a time delay from sending, receiving and executing the Delayed Invalidate Message. Accordingly, if there are multiple Views that initiate the invalidate process during the delay time interval and some of the Views belong to a same View Group, the invalidate data corresponding to a same View Group will be merged.

It should be noted that the delay time interval needs to be smaller than a time interval of a vertical sync (VSYNC) signal. That is, a refresh period of each frame of the GUI is 60 seconds, for example.

In Step S110, all the invalidate data are read from the HashMap and the HashMap is emptied after the delay time interval of the message is reached.

Specifically, after the delay time interval of the Delayed Invalidate Message is reached, the UI thread reads from the HashMap all the invalidate data saved in the HashMap and clears the read invalidate data. Operating from the View Group saved in the data, the invalidate process is completed after remaining invalidate process is done.

In Step S112, the invalidate instruction is executed according to the read invalidate data.

Specifically, the invalidate instruction is executed starting from a corresponding View Group for each invalidate data read from the HashMap until remaining invalidate process is completed. That is, a corresponding invalidate instruction is executed for each View Group corresponding to the invalidate data (using the merged Dirty region)

By merging the invalidate data of multiple Views that belong to a same View Group in a same VSYNC drawing period, the graphical user interface redrawing method proposed in the present embodiment can reduce the number of traversal operations on the overall View Tree for content updates of the UI, thereby improving the whole efficiency of drawing the GUI.

Embodiment 3

The present invention further provides another embodiment, that is, provides a computer readable storage medium, which stores a graphical user interface redrawing program. The graphical user interface redrawing program can be executed by at least one processor such that the at least one processor performs the following steps:

in response to a content update of a View in the graphical user interface, uploading a corresponding invalidate data to a HashMap;

determining whether a View Group to which the View belongs has saved any invalidate data in the HashMap;

in response to having any saved invalidate data, merging the uploaded invalidate data and the saved invalidate data and saving the merged invalidate data to the HashMap;

sending to a user interface (UI) thread a message for delaying execution of an invalidate instruction;

reading all the invalidate data from the HashMap and emptying the HashMap after a delay time interval of the message is reached; and executing the invalidate instruction according to the read invalidate data.

In some embodiments, the graphical user interface redrawing program is executed by the processor to perform a further step of:

in response to a case that the View Group to which the View belongs has not saved any invalidate data in the HashMap, directly saving the uploaded invalidate data to the HashMap.

In some embodiments, the invalidate data includes a reference of the View Group to which the View belongs, and a Dirty region.

In some embodiments, the HashMap uses the reference of the View Group as a primary Key.

In some embodiments, the step of determining whether the View Group to which the View belongs has saved any invalidate data in the HashMap includes:

using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

In some embodiments, the delay time interval is smaller than a time interval of a vertical sync (VSYNC) signal.

In some embodiments, the step of sending to the UI thread the message for delaying execution of the invalidate instruction, performed by executing the graphical user interface redrawing program by the processor, includes:

sending to the UI thread a message with the delay time interval for delaying execution of the invalidate instruction.

It should be noted that in the context, terms "comprise", "include" or any other variation thereof intends to be understood in a non-exclusive sense, so that a process, a method, an object or a device including a series of elements not only include these elements, but also includes other elements not explicitly listed, or further includes elements inherent in the process, the method, the object or the device. In the absence of more restrictions, element defined by a sentence "include(s) a . . . " or "comprise(s) a . . . " does not exclude that other same elements also exist in the process, the method, the object or the device including said element.

The sequence numbers of the embodiments above are intended to facilitate description only, and do not represent the priority or preference of each embodiment.

Through the above description of the embodiments, a person having ordinary skills in the art can clearly know that the method in the above embodiments can be realized by means of software plus necessary general hardware platform. The method may alternatively be realized through hardware. In some cases, the former may be a better implementation mode. Based on this understanding, the solutions of the present invention substantially or the part making a contribution to the prior art may be embodied in the form of software products. The computer software product may be stored in a storage medium (e.g., ROM/RAM, a magnetic disk, and a compact disc) and may include a number of instructions to make a terminal (which can be a mobile phone, a computer, a server, a manager or a network device, etc.) perform the method in each embodiment of the present invention.

The embodiments of the present invention have been described above with reference to accompanying figures. However, the present invention is not limited to the described embodiments. The described embodiments are to be considered only as illustrative and not restrictive. Under the enlightenment of the present invention, a person having ordinary skills in the art can make various forms of changes without departing from the objective of the present invention and the scope as claimed in the claims, and all these variations are with the scope of the present invention.

What is claimed is:

1. A graphical user interface redrawing method, comprising steps of:
   in response to a content update of a View in the graphical user interface, uploading a corresponding invalidate data to a HashMap;
   determining whether a View Group to which the View belongs has saved any invalidate data in the HashMap;
   in response to having any saved invalidate data, merging the uploaded invalidate data and the saved invalidate data and saving the merged invalidate data to the HashMap;
   sending to a user interface (UI) thread a message for delaying execution of an invalidate instruction;
   reading all the invalidate data from the HashMap and emptying the HashMap after a delay time interval of the message is reached; and
   executing the invalidate instruction according to the read invalidate data,
   wherein the step of determining whether the View Group to which the View belongs has saved any invalidate data in the HashMap comprises:
   using the reference of the View Group as a primary Key to check whether any invalidate data have been saved in the HashMap; and if it is found that the HashMap has saved any invalidate data for a same primary Key, determining that the View Group to which the View belongs has saved any invalidate data in the HashMap.

2. The graphical user interface redrawing method according to claim 1, further comprising:
   in response to a case that the View Group to which the View belongs has not saved any invalidate data in the HashMap, directly saving the uploaded invalidate data to the HashMap.

3. The graphical user interface redrawing method according to claim 2, wherein the invalidate data comprises a reference of the View Group to which the View belongs, and a Dirty region.

4. The graphical user interface redrawing method according to claim 2, wherein the HashMap uses the reference of the View Group as the primary Key.

5. The graphical user interface redrawing method according to claim 2, wherein the delay time interval is smaller than a time interval of a vertical sync (VSYNC) signal.

6. The graphical user interface redrawing method according to claim 2, wherein the step of sending to the UI thread the message for delaying execution of the invalidate instruction comprises:
   sending to the UI thread a message with the delay time interval for delaying execution of the invalidate instruction.

7. A terminal device, comprising a storage, a processor and a graphical user interface redrawing program stored in the storage and executable by the processor, wherein the graphical user interface redrawing program is executed by the processor to perform the steps of:
   in response to a content update of a View in the graphical user interface, uploading a corresponding invalidate data to a HashMap;
   determining whether a View Group to which the View belongs has saved any invalidate data in the HashMap;
   in response to having any saved invalidate data, merging the uploaded invalidate data and the saved invalidate data and saving the merged invalidate data to the HashMap;
   sending to a user interface (UI) thread a message for delaying execution of an invalidate instruction;
   reading all the invalidate data from the HashMap and emptying the HashMap after a delay time interval of the message is reached; and
   executing the invalidate instruction according to the read invalidate data,
   wherein the step of determining whether the View Group to which the View belongs has saved any invalidate data in the HashMap, performed by executing the graphical user interface redrawing program by the processor, comprises:
   using the reference of the View Group as a primary Key to check whether any invalidate data have been saved in the HashMap; and if it is found that the HashMap has saved any invalidate data for a same primary Key, determining that the View Group to which the View belongs has saved any invalidate data in the HashMap.

8. The terminal device according to claim 7, wherein the graphical user interface redrawing program is executed by the processor to perform a further step of:
   in response to a case that the View Group to which the View belongs has not saved any invalidate data in the HashMap, directly saving the uploaded invalidate data to the HashMap.

9. The terminal device according to claim 8, wherein the invalidate data comprises a reference of the View Group to which the View belongs, and a Dirty region.

10. The terminal device according to claim 8, wherein the HashMap uses the reference of the View Group as the primary Key.

11. The terminal device according to claim 8, wherein the delay time interval is smaller than a time interval of a vertical sync (VSYNC) signal.

12. A computer readable storage medium, storing a graphical user interface redrawing program, which is executed by a processor to perform the steps of:
   in response to a content update of a View in the graphical user interface, uploading a corresponding invalidate data to a HashMap;
   determining whether a View Group to which the View belongs has saved any invalidate data in the HashMap;
   in response to having any saved invalidate data, merging the uploaded invalidate data and the saved invalidate data and saving the merged invalidate data to the HashMap;
   sending to a user interface (UI) thread a message for delaying execution of an invalidate instruction;
   reading all the invalidate data from the HashMap and emptying the HashMap after a delay time interval of the message is reached; and
   executing the invalidate instruction according to the read invalidate data,
   wherein the step of determining whether the View Group to which the View belongs has saved any invalidate data in the HashMap comprises:
   using the reference of the View Group as the primary Key to check whether any invalidate data have been saved in the HashMap; and if it is found that the HashMap has saved any invalidate data for a same primary Key, determining that the View Group to which the View belongs has saved any invalidate data in the HashMap.

13. The computer readable storage medium according to claim 12, wherein the graphical user interface redrawing program is executed by the processor to perform a further step of:

in response to a case that the View Group to which the View belongs has not saved any invalidate data in the HashMap, directly saving the uploaded invalidate data to the HashMap.

14. The computer readable storage medium according to claim 13, wherein the invalidate data comprises a reference of the View Group to which the View belongs, and a Dirty region.

15. The computer readable storage medium according to claim 13, wherein the HashMap uses the reference of the View Group as the primary Key.

16. The computer readable storage medium according to claim 13, wherein the delay time interval is smaller than a time interval of a vertical sync (VSYNC) signal.

17. The computer readable storage medium according to claim 13, wherein the step of sending to the UI thread the message for delaying execution of the invalidate instruction, performed by executing the graphical user interface redrawing program by the processor, comprises:

sending to the UI thread a message with the delay time interval for delaying execution of the invalidate instruction.

* * * * *